(12) United States Patent
Nyalamadugu et al.

(10) Patent No.: US 10,423,871 B2
(45) Date of Patent: *Sep. 24, 2019

(54) RADIO FREQUENCY IDENTIFICATION TAG IN A LICENSE PLATE

(71) Applicant: NEOLOGY, INC., Poway, CA (US)

(72) Inventors: Sheshi Nyalamadugu, San Diego, CA (US); Joe Mullis, Oceanside, CA (US)

(73) Assignee: Neology, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,845

(22) Filed: Jun. 22, 2017

(65) Prior Publication Data

US 2017/0286822 A1 Oct. 5, 2017

Related U.S. Application Data

(63) Continuation of application No. 15/093,636, filed on Apr. 7, 2016, now Pat. No. 9,691,014.

(60) Provisional application No. 62/144,160, filed on Apr. 7, 2015.

(51) Int. Cl.
*G06K 19/06* (2006.01)
*G06K 19/077* (2006.01)
*G06K 19/073* (2006.01)

(52) U.S. Cl.
CPC ..... *G06K 19/07758* (2013.01); *G06K 19/073* (2013.01); *G06K 19/0772* (2013.01); *G06K 19/07771* (2013.01); *G06K 19/07773* (2013.01)

(58) Field of Classification Search
CPC .............. G06K 19/07749; G06K 19/07773
USPC ................ 235/492, 462.46, 472.02
See application file for complete search history.

(56) References Cited

U.S. PATENT DOCUMENTS

| | | | |
|---|---|---|---|
| 2003/0067389 A1 | 4/2003 | Look | |
| 2004/0095241 A1 | 5/2004 | Maloney | |
| 2006/0261950 A1 | 11/2006 | Arneson et al. | |
| 2007/0171077 A1* | 7/2007 | Kawarizadeh | B60R 11/0264 340/572.8 |
| 2007/0252703 A1 | 11/2007 | Kato et al. | |
| 2008/0042848 A1* | 2/2008 | Roberts | B60R 13/10 340/572.7 |

(Continued)

FOREIGN PATENT DOCUMENTS

WO 2008079902 A1 7/2008

OTHER PUBLICATIONS

ISR/Written Opinion dated Jul. 19, 2016 in corresponding International Application No. PCTUS2016026526, 11 pages.

*Primary Examiner* — Daniel St Cyr
(74) *Attorney, Agent, or Firm* — Procopio; Mark W. Catanese; Noel C. Gillespie (57) ABSTRACT

Techniques, systems, and devices are disclosed for the design and manufacturing of a radio-frequency identification (RFID)-enabled license plate. In one aspect, a proposed RFID-enabled license plate includes a metal plate and a RFID assembly integrated with the metal plate. The RFID assembly further includes a front cover attached to a first side of the metal plate and a back cover attached to a back side of the metal plate opposite to the front cover, and the front cover and the back cover substantially overlap with each other. The RFID assembly additionally includes a RFID tag sandwiched between the front cover and the back cover and is affixed to at least one of the front cover and the back cover. As such, the RFID tag is substantially tamper-proof.

8 Claims, 11 Drawing Sheets

(56) References Cited

U.S. PATENT DOCUMENTS

| | | | |
|---|---|---|---|
| 2009/0164319 A1* | 6/2009 | Kole | G06Q 30/0242 |
| | | | 705/14.41 |
| 2009/0322480 A1 | 12/2009 | Benedict et al. | |
| 2010/0065647 A1 | 3/2010 | Ritamaki et al. | |
| 2010/0283687 A1 | 11/2010 | Ehelen | |
| 2011/0105169 A1 | 5/2011 | Prabhu | |
| 2015/0108226 A1 | 4/2015 | Batra | |
| 2016/0039364 A1* | 2/2016 | Findlay | B60R 13/105 |
| | | | 340/468 |

\* cited by examiner

RADIO FREQUENCY IDENTIFICATION TAG IN A LICENSE PLATE

PRIORITY CLAIM AND RELATED PATENT APPLICATIONS

This patent document is a continuation of U.S. application Ser. No. 15/093,636 entitled "RADIO FREQUENCY IDENTIFICATION TAG" and filed on Apr. 7, 2016, now U.S. Pat. No. 9,691,014, which claims the benefit of priority under 35 U.S.C. 119(e) to U.S. Provisional Application No. 62/144,160 entitled "RADIO FREQUENCY IDENTIFICATION TAG" and filed on Apr. 7, 2015. The disclosures of the above applications are incorporated by reference in their entirety as a part of this document.

BACKGROUND

1. Technical Field

This patent document generally relates to radio frequency identification (RFID) systems and more particularly to the design and manufacturing of RFID tags and RFID-enabled license plates.

2. Related Art

RFID technology harnesses electromagnetic fields to transfer data wirelessly. One of the primary uses for RFID technology is the automatic identification and tracking of objects via RFID tags. An RFID tag may be attached to or incorporated into a variety of objects, and may have applications in numerous areas. For example, a license plate that includes an RFID tag may be used for the purposes of electronic tolling, parking access, and border control.

However, a conventional license plate including a RFID tag may not be sufficiently secure. In particular, a conventional RFID tag that is attached to or incorporated into a license plate in a conventional manner may not provide adequate weather proofing and tamper proofing capabilities.

SUMMARY

Embodiments described herein provide various designs of radio frequency identification (RFID)-enable license plates which are both tamper-proof and weather-proof. The subject matter described in this patent document can be implemented in specific ways that provide one or more of the following features. For example, a proposed RFID-enable license plate can be constructed by integrating a metal license plate with a RFID assembly that includes a RFID tag. This RFID assembly may further include a front cover attached to the front side of the license plate and a back cover attached to the back side of the license plate opposite to the front cover, and the RFID tag is affixed to the at least one of the front cover and the back cover. The license plate may further include a cutout which is positioned between the front cover and the back cover so that the front cover and the back cover can join each other inside the cutout and the RFID tag can be positioned substantially within the cutout. Moreover, adhesives such as very high bond (VHB) may be used to seal off spaces between the front cover and the front side of the license plate and between the back cover and the back side of the metal plate, rendering the RFID-enable license plate both tamper-proof and weather-proof. Further weather-proofing can be achieved by covering the RFID tag with a protective film layer and further tamper-proofing can be achieved by including at least one tear guide in the RFID tag. As another example, a proposed RFID-enable license plate can be constructed by integrating a metal license plate with a RFID assembly that includes a RFID tag and a back cover, without using a front cover. The back cover of the RFID assembly may be attached to the back side of the license plate so that the RFID tag is sandwiched between the back side of the license plate and the back cover and is affixed to the back cover. The back cover is affixed to the back side of the license plate using a set of adhesives which follows the perimeter of the back cover, rendering the RFID-enable license plate both tamper-proof and weather-proof.

In one aspect, a radio-frequency identification (RFID)-enabled license plate is disclosed. This RFID-enabled license plate includes a metal plate and a RFID assembly integrated with the metal plate. The RFID assembly further includes a front cover attached to a first side of the metal plate and a back cover attached to the back side of the metal plate opposite to the front cover, and the front cover and the back cover substantially overlap with each other. The RFID assembly additionally includes a RFID tag sandwiched between the front cover and the back cover and is affixed to at least one of the front cover and the back cover. As such, the RFID tag is substantially tamper-proof.

In some embodiments, the metal plate also includes a cutout which is positioned between the front cover and the back cover and the RFID tag is positioned substantially within the cutout.

In some embodiments, the front cover and the back cover join each other inside the cutout at an embossed structure on the front cover.

In some embodiments, the RFID tag is affixed to the at least one of the front cover and the back cover using adhesives, such as using very high bond (VHB).

In some embodiments, the front cover is affixed to the first side of the metal plate using a first set of adhesives which follow a perimeter of the front cover, and the back cover is affixed to the second side of the metal plate using a second set of adhesives which follow a perimeter of the back cover. As a result, the first and second sets of adhesives seal off spaces between the front cover and the first side of the metal plate and between the back cover and the second side of the metal plate. In some embodiments, the first and second sets of adhesives include VHBs.

In some embodiments, the cutout includes a first portion which is used to accommodate the RFID tag and a second portion configured as a slot antenna.

In some embodiments, the front cover includes a first portion configured to cover the first portion of the cutout and a second portion configured to cover the second portion of the cutout. Moreover, the second portion of the front cover has geometry of the slot antenna.

In some embodiments, the second portion of the front cover is configured in a centered position with respect to the first portion of the front cover.

In some embodiments, the second portion of the front cover is configured in an off-centered position with respect to the first portion of the front cover.

In some embodiments, the RFID tag further includes an RFID chip and an antenna loop which is electrically coupled to the RFID chip. Moreover, the RFID chip and the antenna loop are disposed on a substrate.

In some embodiments, the RFID tag further includes a protective film layer which is attached to the substrate to form a weather-proof enclosure for the RFID chip and the antenna loop.

In some embodiments, the RFID tag also includes at least one tear guide.

In another aspect, a RFID assembly is disclosed. This RFID assembly includes a RFID tag which further includes an RFID chip and an antenna loop which is electrically coupled to the RFID chip. The RFID chip and the antenna loop are disposed on a substrate. The RFID assembly also includes a front cover and back cover, such that the RFID tag is sandwiched between the front cover and the back cover and is affixed to at least one of the front cover and the back cover.

In some embodiments, the RFID tag further includes a protective film layer which is attached to the substrate to form a weather-proof enclosure for the RFID chip and the antenna loop. In some embodiments, the protective film layer includes polyethylene terephthalate (PET).

In some embodiments, the protective film layer is welded to the substrate around the perimeter of substrate. For example, the protective film layer can be welded to the substrate using laser welding or sonic welding.

In some embodiments, one of the front cover and the back cover includes a heat stake, and the RFID tag is attached to the one of the front cover and the back cover using the heat stake.

In some embodiments, the other of the front cover and the back cover includes an energy director, and the RFID tag is attached to the other of the front cover and the back cover at the energy director.

In some embodiments, the RFID tag is attached to the energy director using one of the following: laser welding and sonic welding. In some embodiments, the RFID tag further comprises at least one tear guide.

In some embodiments, at least one of the front cover and the back cover includes an injection molded component.

In some embodiments, the one of the front cover and the back cover includes an injection molded component, and the other of the front cover and the back cover is cut from a flat sheet.

In yet another aspect, another RFID-enabled license plate is disclosed. This RFID-enabled license plate includes a license plate and a RFID assembly integrated with the license plate. The RFID assembly further includes a back cover attached to the back side of the license plate and a RFID tag sandwiched between the back side of the license plate and the back cover and is affixed to the back cover. As such, the RFID tag is tamper-proof. In some embodiments, the back cover is affixed to the back side of the license plate using a set of adhesives which follows a perimeter of the back cover, and the set of adhesives seals off spaces between the back side of the license plate and the perimeter of the back cover.

Other features and advantages of the present inventive concept should be apparent from the following description which illustrates by way of example aspects of the present inventive concept.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Embodiments described herein provide various designs of radio frequency identification (RFID)-enable license plates which are both tamper-proof and weather-proof. The subject matter described in this patent document can be implemented in specific ways that provide one or more of the following features. For example, a proposed RFID-enable license plate can be constructed by integrating a metal license plate with a RFID assembly that includes a RFID tag. This RFID assembly may further include a front cover attached to the front side of the license plate and a back cover attached to the back side of the license plate opposite to the front cover, and the RFID tag is affixed to the at least one of the front cover and the back cover. The license plate may further include a cutout which is positioned between the front cover and the back cover so that the front cover and the back cover can join each other inside the cutout and the RFID tag can be positioned substantially within the cutout. Moreover, adhesives such as very high bond (VHB) may be used to seal off spaces between the front cover and the front side of the license plate and between the back cover and the back side of the metal plate, rendering the RFID-enable license plate both tamper-proof and weather-proof. Further weather-proofing can be achieved by covering the RFID tag with a protective film layer and further tamper-proofing can be achieved by including at least one tear guide in the RFID tag.

As another example, a proposed RFID-enable license plate can be constructed by integrating a metal license plate with a RFID assembly that includes a RFID tag and a back cover, without using a front cover. The back cover of the RFID assembly may be attached to the back side of the license plate so that the RFID tag is sandwiched between the back side of the license plate and the back cover and is affixed to the back cover. The back cover is affixed to the back side of the license plate using a set of adhesives which follows the perimeter of the back cover, rendering the RFID-enable license plate both tamper-proof and weather-proof.

Figure 1A:
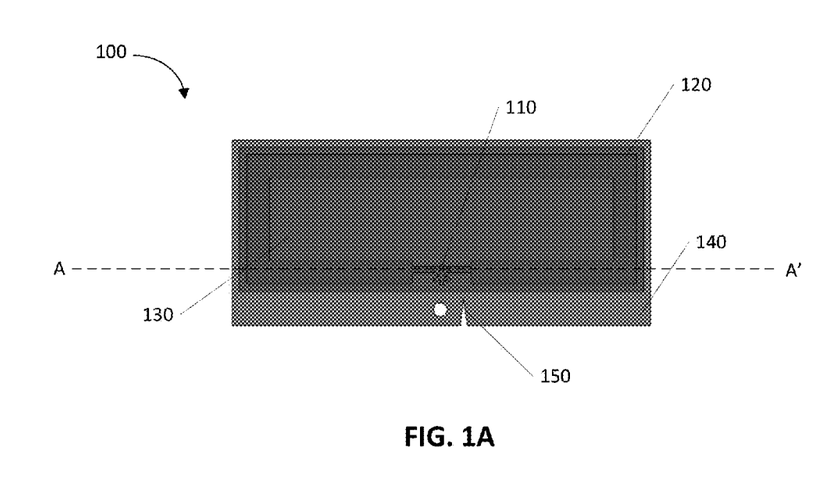
FIG. 1A shows a top view of an exemplary radio frequency identification (RFID) tag in accordance with some embodiments described herein.

FIG. 1A shows a top view of an exemplary radio frequency identification (RFID) tag 100 in accordance with some embodiments described herein. As illustrated in FIG. 1A, RFID tag 100 includes an integrated circuit (IC) chip 110 (or "chip 110" hereinafter) and an antenna 120, which form an RFID module. Chip 110 may include a memory (not shown) and other circuits. While FIG. 1A shows antenna 120 configured as a rectangular loop, antenna 120 may be configured in other geometries without departing from the scope of the present inventive concept. RFID tag 100 also includes a substrate 130 which provides structural supports for chip 110 and antenna 120. In various embodiments, chip 110 and antenna 120 may be deposited or fabricated on substrate 130. RFID tag 100 also includes a protective film layer to enclose and seal the RFID module of RFID tag 100 including chip 110 and antenna 120. This protective film layer, which is over the RFID module and substrate 130, is described in more detail below in conjunction with FIG. 1B.

Also shown in FIG. 1A, RFID tag 100 further includes a welded area 140 and a tear guide 150 configured as a notch located on an edge of welded area 140. In the embodiment of FIG. 1A, welded area 140 includes a perimeter portion of the RFID tag 100. Moreover, welded area 140 can be a portion of substrate 130, such as the perimeter of substrate 130. However, welded area 140 may include a different portion of RFID tag 100 without departing from the scope of the present inventive concept. In some embodiments, the protective film layer is welded onto substrate 130 at welded area 140. For example, the protective film layer can be sonic or laser welded to the substrate 130 around the perimeter of substrate 130. In this example, welded area 140 is the perimeter of substrate 130. In addition to welding, other techniques may be used to join the protective film layer to the substrate 130.

In some embodiments, RFID tag 100 is configured to tear along a prefabricated tear guide 150. As such, RFID tag 100 can be destroyed or otherwise rendered nonfunctional in the event of tampering. Although tear guide 150 is shown to be positioned in welded area 140 on an edge of RFID tag 100, a person having ordinary skill in the art can appreciate that tear guide 150 can be located in a different portion of RFID tag 100, for example, on a different edge of RFID tag 100. Tear guide 150 may be positioned near the center of an edge or in an off-centered position such as in the embodiment shown. Furthermore, while tear guide 150 is shown as a V-shaped notch in the welded area 140, tear guide 150 may be configured as an indentation, a score, a cut or in other forms for easy tearing. Moreover, RFID tag 100 can include more than one tear guide without departing from the scope of the present inventive concept. For example, RFID tag 100 can include a second tear guide positioned on an opposite edge from the edge that contains tear guide 150. Notably, it is desirable to place tear guide 150 in a "weak" area of RFID tag 100 so that RFID tag 100 can be torn up easily at tear guide 150 with a reasonable amount of applied stress.

In some embodiments, RFID tag 100 can be coupled (e.g., inductively or capacitatively) to a metal license plate via substrate 130. According to one exemplary embodiment, the metal license plate can serve as a radiator for RFID tag 100. Various configurations of an RFID-enabled license plate are described in U.S. Pat. No. 8,344,890, the disclosures of which are incorporated by reference herein in their respective entirety.

In various embodiments, instead of using the combination of chip 110 and antenna 120, RFID tag 100 can be implemented as an "RFID strap." The RFID strap can include chip 110 and various contacts (not shown) that can be connected to or capacitively coupled to a metal license plate. In these embodiments, the metal license plate can serve as a slot antenna for RFID tag 100. RFID straps are described in U.S. Reissued Pat. Nos. 44,165 and 43,488, the disclosures of which are incorporated by reference herein in their respective entirety.

In some embodiments, RFID tag 100 may be configured to support multiple frequencies. Multi-frequency RFID tags are described in Reissued U.S. Pat. Nos. RE 43,355 and RE 44,691, the disclosures of which are incorporated by reference herein in their respective entirety.

In some embodiments, access to a memory (not shown) on chip 110 can be granted based on a security key. The provision of secure identification solutions is described in U.S. Pat. Nos. 7,081,819, 7,671,746, 8,237,568, 8,322,044, and 8,004,410, the disclosures of which are incorporated by reference herein in their respective entirety.

Figure 1B:
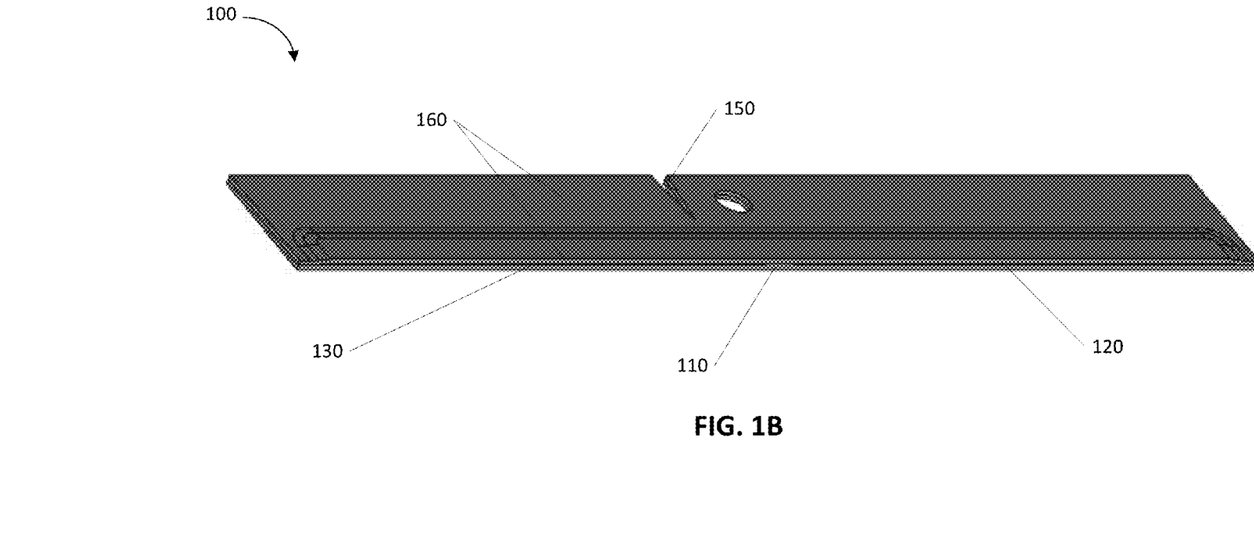
FIG. 1B shows a cross-sectional view of the RFID tag along line A-A' in FIG. 1A in accordance with some embodiments described herein.

FIG. 1B shows a cross-sectional view of RFID tag 100 along line A-A' in FIG. 1A in accordance with some embodiments described herein. Comparing with FIG. 1A, FIG. 1B provides a better viewing angle of the protective film layer discussed above. As illustrated in FIG. 1B, RFID tag 100 includes the above-mentioned protective film layer 160 which is constructed as a top layer of RFID tag 100 over chip 110, antenna 120, and substrate 130, wherein chip 110 and antenna 120 is sandwiched between and protected by protective film layer 160 and substrate 130. Note that protective film layer 160 and substrate 130 form a sealed enclosure for chip 110, antenna 120 and other functional components of RFID tag 100, which renders RFID tag 100 weather-proof. In one exemplary embodiment, protective film layer 160 may be constructed from polyethylene terephthalate (PET). However, the protective film layer may be constructed from a different material without departing from the scope of the present inventive concept.

As discussed above, protective film layer 160 can be joined with substrate 130 of RFID tag 100 by welding, such as by welding to substrate 130 along welded area 140. In some embodiments, protective film layer 160 can be welded to substrate 130 using sonic welding. In other embodiments, protective film layer 160 can be welded to substrate 130 using laser welding. As such, protective film layer 160 and substrate 130 form a protective enclosure for the RFID module including chip 110 and antenna 120, which renders RFID tag 100 weather-proof by sealing and/or enclosing the functional components of RFID tag 100. A person having ordinary skill in the art can appreciate that a different welding technique may be employed to join protective film layer 160 to substrate 130.

Figure 2:
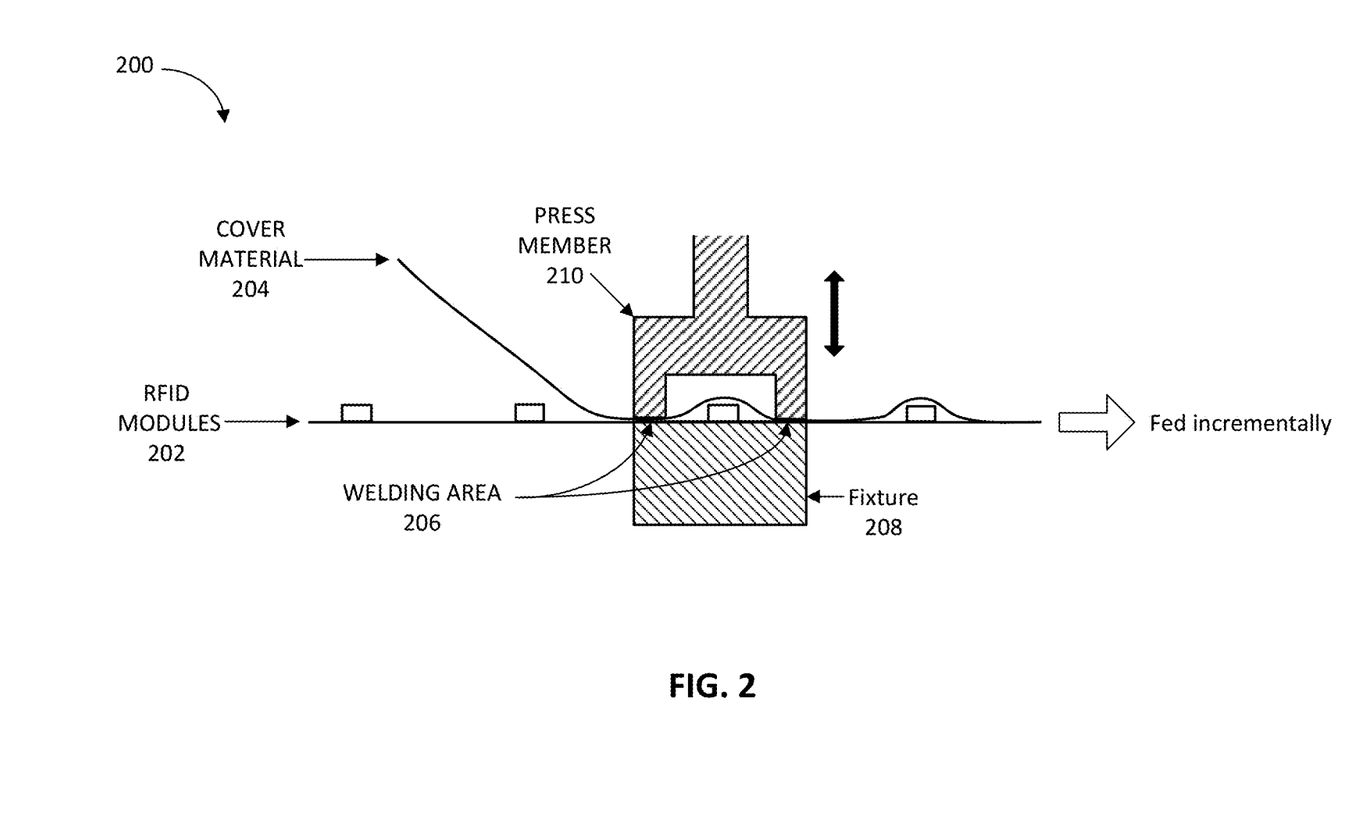
FIG. 2 illustrates an exemplary welding process for manufacturing RFID tags of FIGS. 1A-1B in accordance with some embodiments described herein.

FIG. 2 illustrates an exemplary welding process 200 for manufacturing RFID tags 100 in accordance with some embodiments described herein. Referring to FIGS. 1A-1B and 2, welding process 200 illustrated in FIG. 2 may be employed to join protective film layer 160 to substrate 130 of RFID tag 100. As illustrated in FIG. 2, welding process 200 can be a roll-to-roll process. More specifically, a roll of RFID modules 202, which can include a linear or two-dimensional array of RFID modules, is placed facing up, wherein each of RFID modules includes an IC chip and traces fabricated on a substrate. Meanwhile, a roll of cover material 204, such as a material for fabricating protective film layer 160 in FIG. 1B, is positioned over the role of RFID modules 202. In the embodiment shown, both the roll of RFID modules 202 and the roll of cover material 204 are fed horizontally and incrementally through a welding area 206 (e.g., a sonic or laser welding station) which includes a welding fixture 208 positioned at the bottom and a welding press member 210 positioned on top and moves vertically as shown. As the roll of RFID modules 202 and the roll of cover material 204 pass through welding area 206, welding press member 210 is configured to weld a portion of the protective film material in the roll of cover material 204 to a corresponding RFID module or modules in the roll of RFID modules 202, whereby forming the RFID tags 100 shown in FIGS. 1A and 1B.

While various embodiments of RFID tag 100 described above provide weather-proofing capability, they may still be prone to tampering in some outdoor applications such as when they are used in RFID-enable license plates. For example, if RFID tag 100 is placed on a license plate in a manner similar to a conventional registration sticker, it can be easily stolen and/or tampered with. Hence, it is desirable to make RFID tag 100 tamper-proof in certain applications such as when used in RFID-enable license plates.

Figure 3A:
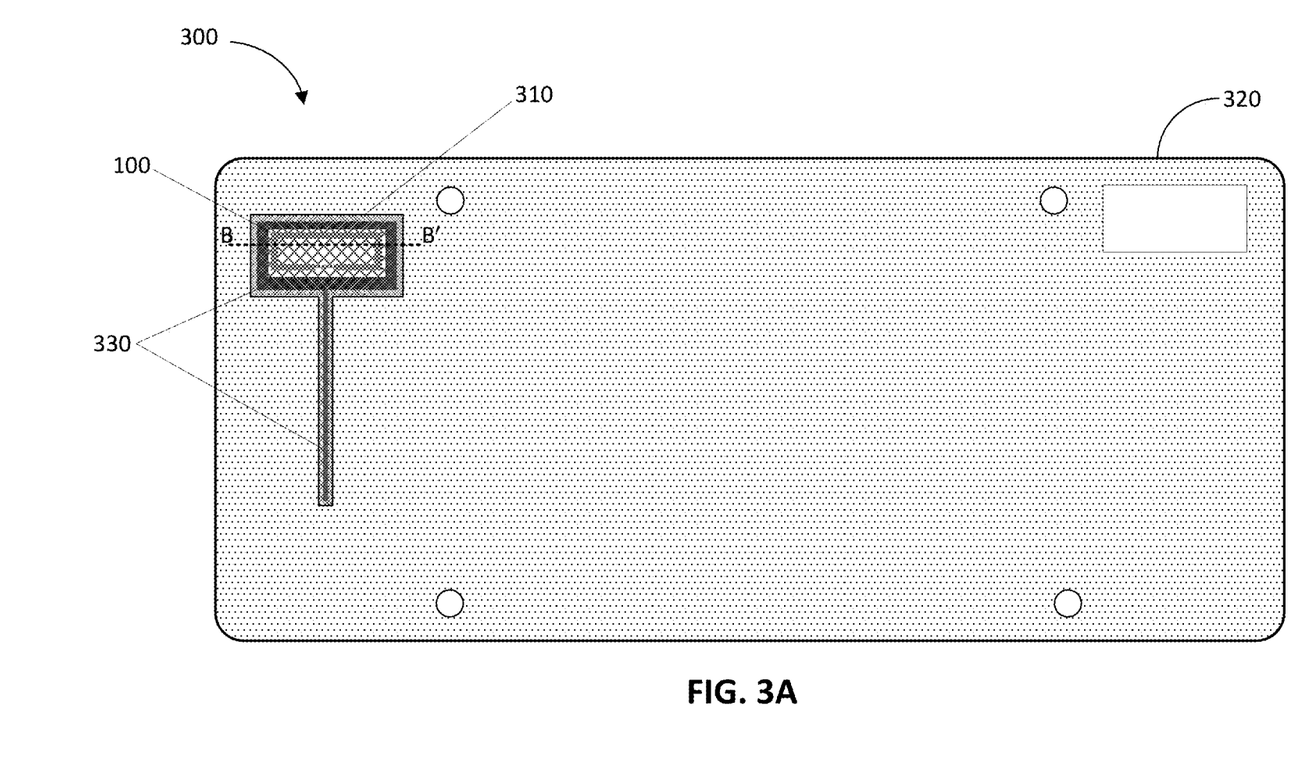
FIG. 3A shows a top-view illustration of an exemplary RFID-enabled license plate including an exemplary RFID assembly integrated with a license plate in accordance with some embodiments described herein.

FIG. 3A shows a top-view illustration of an exemplary RFID-enabled license plate 300 including an exemplary RFID assembly 310 integrated with a license plate 320 in accordance with some embodiments described herein. As can be seen in FIG. 3A, RFID-enabled license plate 300 includes a cutout 330 (having appearance of a dark rectangle and a slot) manufactured through and positioned on a side of license plate 320. While not explicitly shown, RFID assembly 310 includes both a front cover and a back cover which are assembled on the front side and the back side of license plate 320, respectively. The front and back covers of RFID assembly 310 are described in more detail below in conjunction with FIGS. 3B and 3C. In various embodiments, RFID assembly 310 is positioned on license plate 320 so that it has a significant overlap with cutout 330. As such, the front cover and the back cover of RFID assembly 310 can be joined through cutout 330 to form a temper-proof structure. RFID assembly 310 also includes RFID tag 100 as described in FIGS. 1A and 1B. RFID tag 100 may be attached to one of both of the front cover and the back cover of RFID assembly 310, wherein various examples of attachment are described below. Although the embodiment in FIG. 3A shows upper part of cutout 330 having a rectangle shape, other embodiments of cutout 330 can have non-rectangle shapes without departing from the scope of the present inventive concept.

Figure 3B:
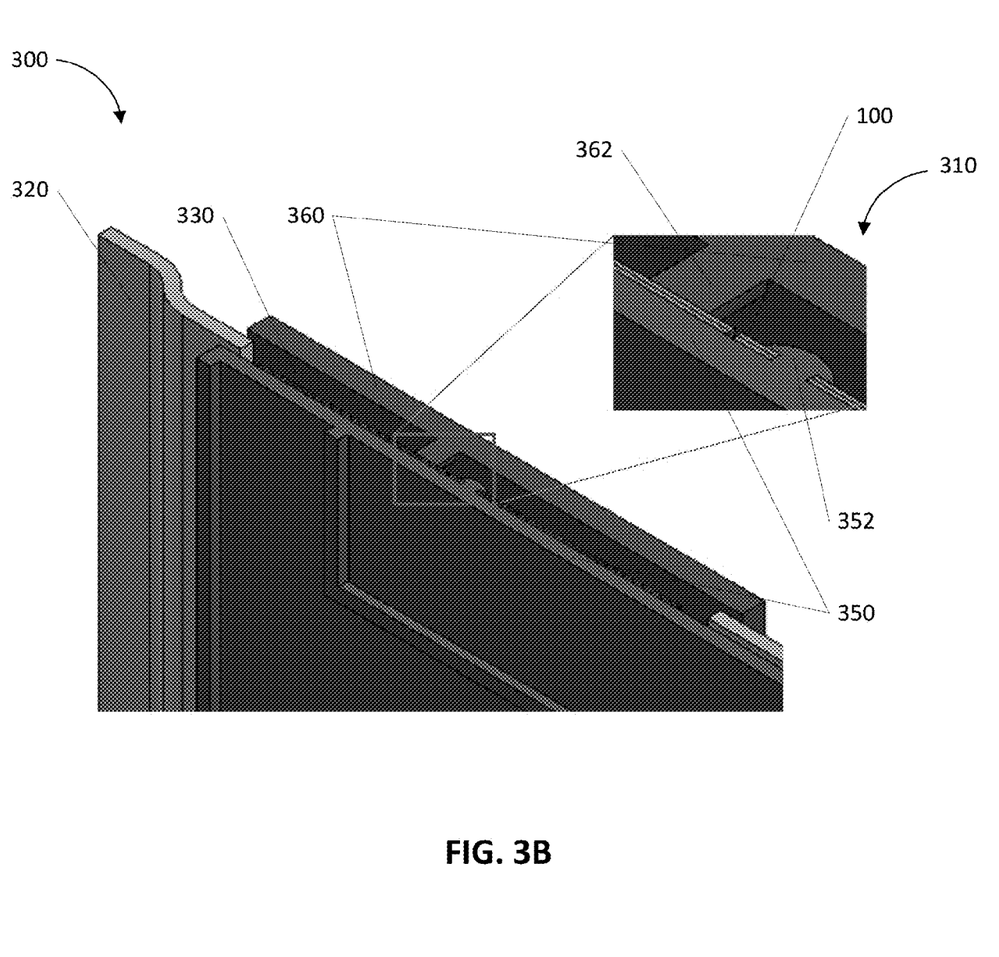
FIG. 3B shows a cross-sectional view of a portion of the RFID-enabled license plate along a line BB' to illustrate an exemplary implementation of the RFID assembly in FIG. 3A in accordance with some embodiments described herein.

FIG. 3B shows a cross-sectional view of a portion of the RFID-enabled license plate 300 along a line B-B' to illustrate an exemplary implementation of RFID assembly 310 in FIG. 3A in accordance with some embodiments described herein. As can be seen in FIG. 3B, RFID assembly 310 includes a front cover 350, a back cover 360, and RFID tag 100 which is sandwiched between front cover 350 and back cover 360. Also can be seen in FIG. 3B, front cover 350 is attached to license plate 320 on one side of license plate 320 and over cutout 330, while back cover 360 is attached to plate 320 on the other side of license plate 320 and over cutout 330. In various embodiments, front cover 350 and back cover 360 can be attached to license plate 320 using adhesives (e.g., adhesive strips). Because license plate 320 and cutout 330 separate front cover 350 from back cover 360, a gap is created in the RFID assembly 310 as shown. In some embodiments, one or both of the front cover 350 and the back cover 360 can be injection molded components.

The inset figure in FIG. 3B shows a zoomed-in illustration of a region of assembly 310 where RFID tag 100 is assembled with both front cover 350 and back cover 360. As can be seen in the inset figure, RFID tag 100 is both attached to a surface of front cover 350 as well as making contact with back cover 360. More specifically, front cover 350 also includes a heat stake 352. Hence, RFID tag 100 can be affixed to the front cover 350 using heat stake 352. For example, after punching heat stake 352 through a hole in RFID tag 100, heat stake 352 can be melted and reformed to create a locking head over the RFID tag 100. Alternately or in addition, RFID tag 100 can be welded (e.g., using sonic or laser welding) to back cover 360. In the embodiment shown in FIG. 3B, back cover 360 includes an energy director 362 configured as a protrusion from back cover 360. As such, RFID tag 100 can be welded to back cover 360 at energy director 362. A person having ordinary skill in the art can appreciate that RFID tag 100 can be joined to front cover 350 and/or back cover 360 using a different mechanism without departing from the scope of the present inventive concept. For example, RFID tag 100 can be joined to front cover 350 by way of an energy director and back cover 360 using a heat stake.

Some applications may require a placement of metallic material (e.g., retro-reflective material, holographic image) over RFID-enabled license plate 300 and therefore over RFID assembly 310. In order to preserve the transmission and reception capabilities of the RFID tag, a selective de-metallization process may be employed to treat the metallic material. Selective de-metallization is described in U.S. Pat. Nos. 7,034,688 and 7,463,154, the disclosures of which are incorporated by reference herein in their respective entirety.

Notably, the above described RFID-enabled license plate 300 including RFID assembly 310 constructed with a combination of heating staking and welding (e.g., sonic or laser) renders RFID tag 100 tamper-proof. According to one exemplary embodiment, RFID tag 100 can include additional tamper-proof features such as the prefabricated tear guide 150 described above. In various embodiments, RFID tag 100 is configured to tear along the prefabricated tear guide 150. As such, RFID tag 100 can be destroyed or otherwise rendered nonfunctional in the event of tampering.

Figure 3C:
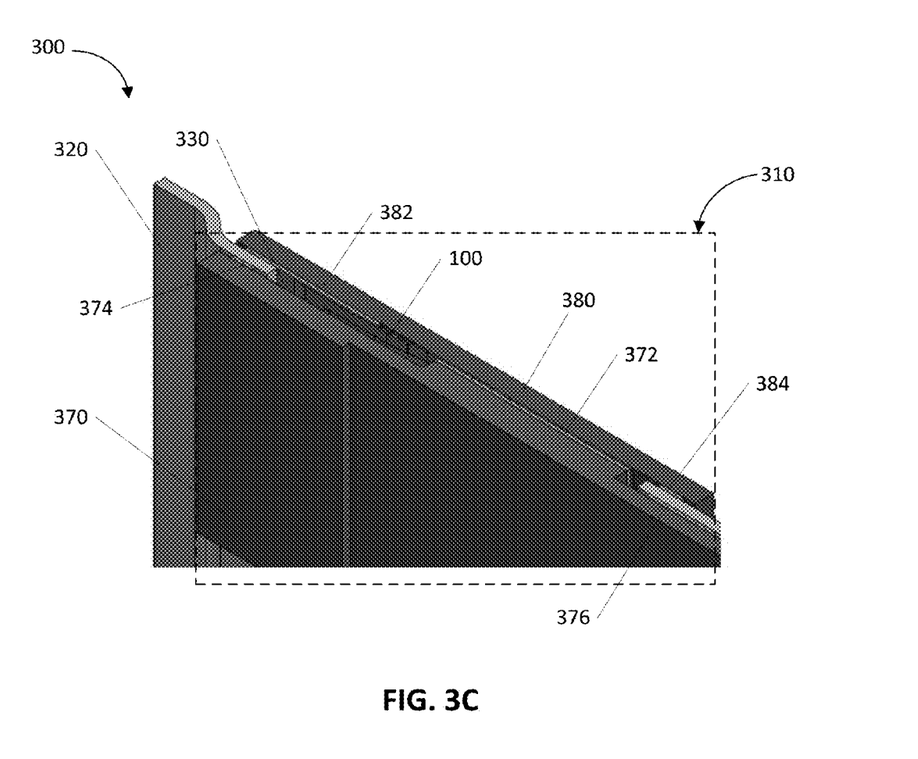
FIG. 3C shows a cross-sectional view of a portion of the RFID-enabled license plate along the line BB' to illustrate another exemplary implementation of RFID assembly in FIG. 3A in accordance with some embodiments described herein.

FIG. 3C shows a cross-sectional view of a portion of the RFID-enabled license plate 300 along the line BB' to illustrate another exemplary implementation of RFID assembly 310 in FIG. 3A in accordance with some embodiments described herein. Similarly to the embodiment in FIG. 3B, the embodiment of RFID assembly 310 in FIG. 3C includes a front cover 370, a back cover 380, and RFID tag 100 which is sandwiched between front cover 370 and back cover 380. Moreover, front cover 370 is attached to license plate 320 on one side of license plate 320 and over cutout 330, while back cover 380 is attached to license plate 320 on the other side of license plate 320 and over cutout 330. In one exemplary embodiment, front cover 370 can be an injection molded component while back cover 380 can be cut from a flat sheet.

In various embodiments, RFID tag 100 can be adhered to both front cover 370 and back cover 380 using sticky tapes such as very high bond (VHB). For example, FIG. 3C shows that RFID tag 100 is adhered to front cover 370 using a VHB bond 372 which is placed between front cover 370 and RFID tag 100. In this particular embodiment shown, VHB bond 372 is adhered to a protruding area of front cover 370 which when assembled with license plate 320, makes contact with both RFID tag 100 and back cover 380 through cutout 330. Also shown in FIG. 3C, RFID tag 100 is adhered to back cover 380 using another VHB bond 382 which is placed between back cover 380 and RFID tag 100. In this particular embodiment shown, a portion of VHB bond 382 is also adhered onto license plate 320. While this embodiment uses a flat back cover and embossed front cover, other configurations of front cover 370 and back cover 380 for attaching RFID tag 100 with VHBs can be used without departing from the scope of the present inventive concept.

Also shown in FIG. 3C, in addition to the portion of VHB bond 382 which is placed between the back cover 380 and license plate 320, additional VHBs 374, 376 and 384 are used which substantially follow the perimeter of RFID assembly 310 to completely seal off holes and slots between RFID assembly 310 and plate 320. Notably, by adhering RFID tag 100 to both front cover 370 and back cover 380 using VHBs, and assembling front cover 370 and back cover 380 with a license plate from the front and the back surfaces of the license plate renders RFID tag 100 tamper-proof. Moreover, using VHBs which substantially follow the perimeter of RFID assembly 310 to completely seal off holes and slots between RFID assembly 310 and license plate 320 renders RFID assembly 310 weather proof and reinforces the tamper-proof nature of the assembly. Furthermore, RFID tag 100 can include additional tamper-proof features such as the prefabricated tear guide described above, so that RFID tag 100 can be destroyed or otherwise rendered nonfunctional if it is tampered with.

Figure 3D:
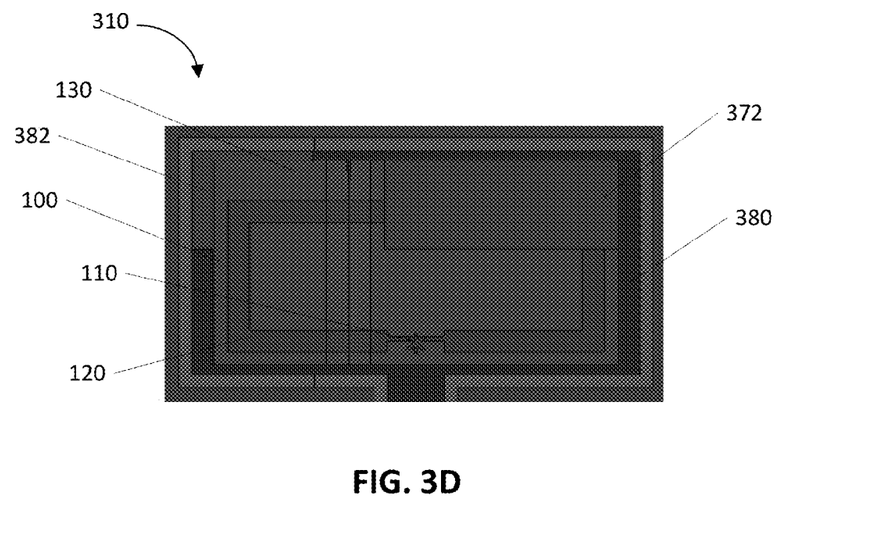
FIG. 3D shows a front view of the tamper-proof and weather-proof RFID assembly including the RFID tag described in FIG. 3C in accordance with some embodiments described herein.

FIG. 3D shows a front view of the tamper-proof and weather-proof RFID assembly 310 including the RFID tag 100 described in FIG. 3C in accordance with some embodiments described herein. More specifically, the view is generated at a plane behind front cover 370 and looking toward back cover 380. As such, front cover 370 is not visible in FIG. 3D. As can be seen in FIG. 3D, the exemplary RFID assembly 310 includes the RFID tag 100, which further includes the chip 110 and the antenna 120 disposed on the substrate 130. FIG. 3D shows an embodiment of VHB bond 372 positioned on top of RFID tag 100 for bonding RFID tag 100 to the front cover 370 (not shown). Note that the position and shape of VHB bond 372 shown are only exemplary, while various other configurations of VHB bond 372 can be used in RFID assembly 310 without departing from the scope of the present inventive concept. FIG. 3D also shows an embodiment of VHB bond 382 positioned behind RFID tag 100 for bonding RFID tag 100 to the back cover 380. The position and shape of VHB bond 382 shown are only exemplary, while various other configurations of VHB bond 382 can be used in RFID assembly 310 without departing from the scope of the present inventive concept.

Figure 3E:
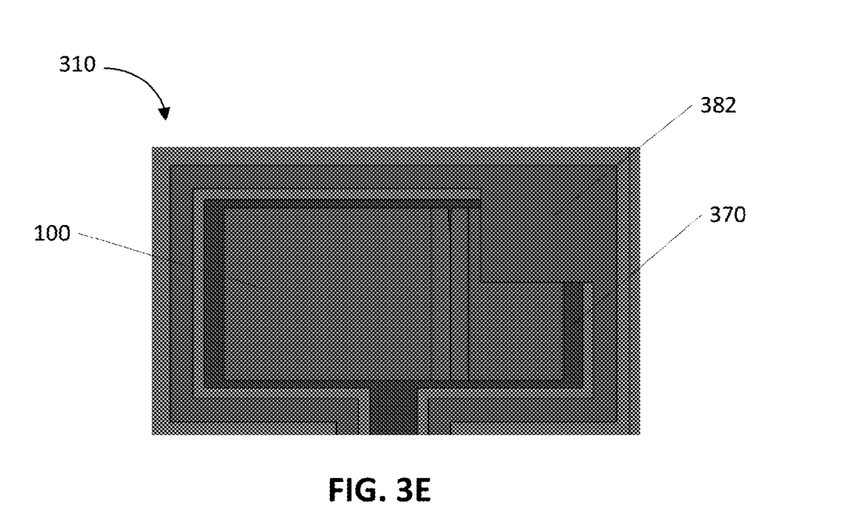
FIG. 3E shows a back view of the tamper-proof and weather-proof RFID assembly including the RFID tag described in FIG. 3C in accordance with some embodiments described herein.

FIG. 3E shows a back view of the tamper-proof and weather-proof RFID assembly 310 including the RFID tag 100 described in FIG. 3C in accordance with some embodiments described herein. More specifically, the view is generated at a plane in front of back cover 380 and looking toward front cover 370. As such, back cover 380 is not visible in FIG. 3E. In addition to the RFID tag 100, FIG. 3E shows an embodiment of VHB bond 382 positioned in a corner of RFID tag 100 for bonding RFID tag 100 to the back cover 380 (not shown). Note that the position and shape of VHB bond 382 shown are only exemplary, while various other configurations of VHB bond 382 can be used in RFID assembly 310 without departing from the scope of the present inventive concept. FIG. 3E also shows front cover 370 positioned in front of the exemplary RFID tag 100.

Figure 3F:
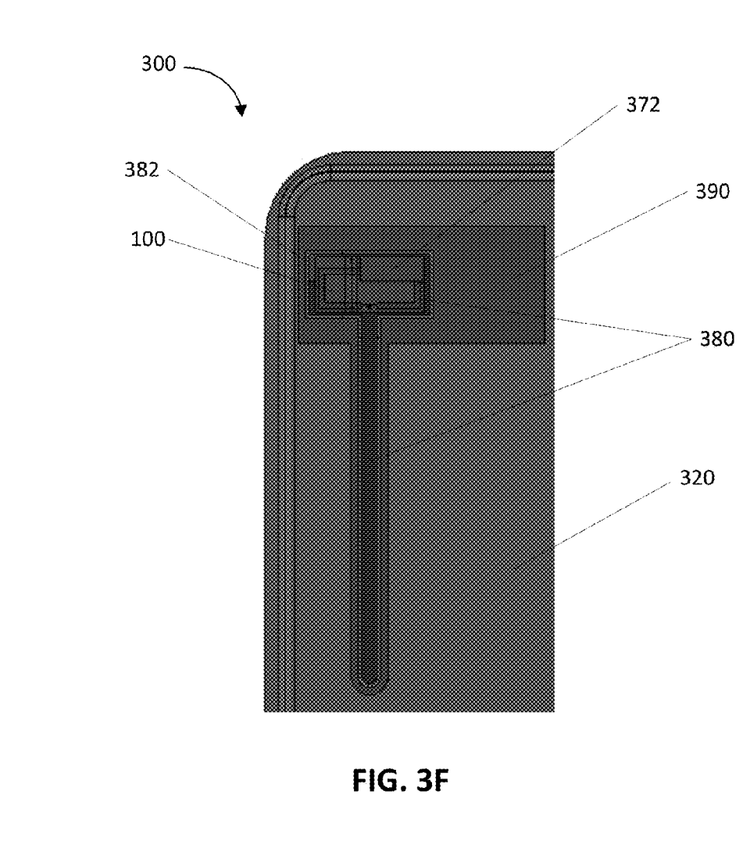
FIG. 3F shows a front view of a portion of the RFID-enabled license plate including the tamper-proof and weather-proof RFID assembly described in FIG. 3C assembled with the license plate in accordance with some embodiments described herein.

FIG. 3F shows a front view of a portion of the RFID-enabled license plate 300 including the tamper-proof and weather-proof RFID assembly 310 described in FIG. 3C assembled with license plate 320 in accordance with some embodiments described herein. More specifically, the view is generated at a plane behind front cover 370 and looking toward back cover 380. As such, front cover 370 is not visible in FIG. 3F. As can be seen in FIG. 3F, RFID assembly 310 is positioned near the upper left corner of license plate 320. RFID assembly 310 in FIG. 3F includes substantially all the components shown in FIG. 3D including RFID tag 100 and back cover 380. Embodiment of back cover 380 in FIG. 3F also includes a long and narrow section which can be fit into the slot section of the cutout in license plate 320. In addition to the VHBs 372 and 382 already shown in FIG. 3D, RFID assembly 310 in FIG. 3F also includes a large VHB 390 which is configured to substantially follow the perimeter of RFID assembly 310 around front cover 370 to completely seal off holes and slots between front cover 370 of RFID assembly 310 and license plate 320.

Figure 3G:
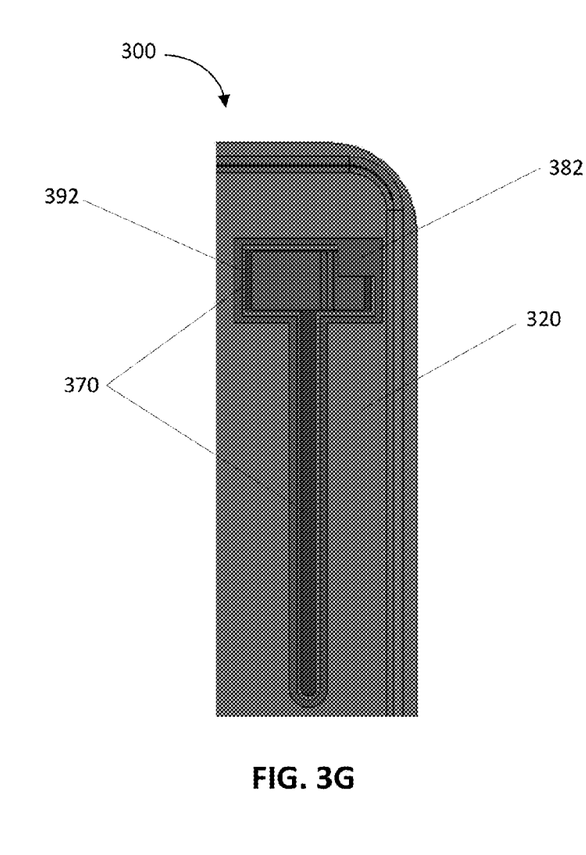
FIG. 3G shows a back view of a portion of the RFID-enabled license plate including the tamper-proof and weather-proof RFID assembly described in FIG. 3C assembled with license plate 320 in accordance with some embodiments described herein.

FIG. 3G shows a back view of a portion of the RFID-enabled license plate 300 including the tamper-proof and weather-proof RFID assembly 310 described in FIG. 3C assembled with license plate 320 in accordance with some embodiments described herein. More specifically, the view is generated at a plane in front of back cover 380 and looking toward front cover 370. As such, back cover 380 is not visible in FIG. 3G. RFID assembly 310 in FIG. 3G includes substantially all the components shown in FIG. 3E including RFID tag 100 and front cover 370. Similarly to FIG. 3F, embodiment of front cover 370 in FIG. 3G also includes a long and narrow section which can be fit into the slot section of the cutout in license plate 320. In addition to the VHB 382 already shown in FIG. 3E, RFID assembly 310 in FIG. 3G also includes a large VHB 392 which is configured to substantially follow the perimeter of RFID assembly 310 around back cover 380 to completely seal off holes and slots between back cover 380 of RFID assembly 310 and license plate 320.

Figure 4:
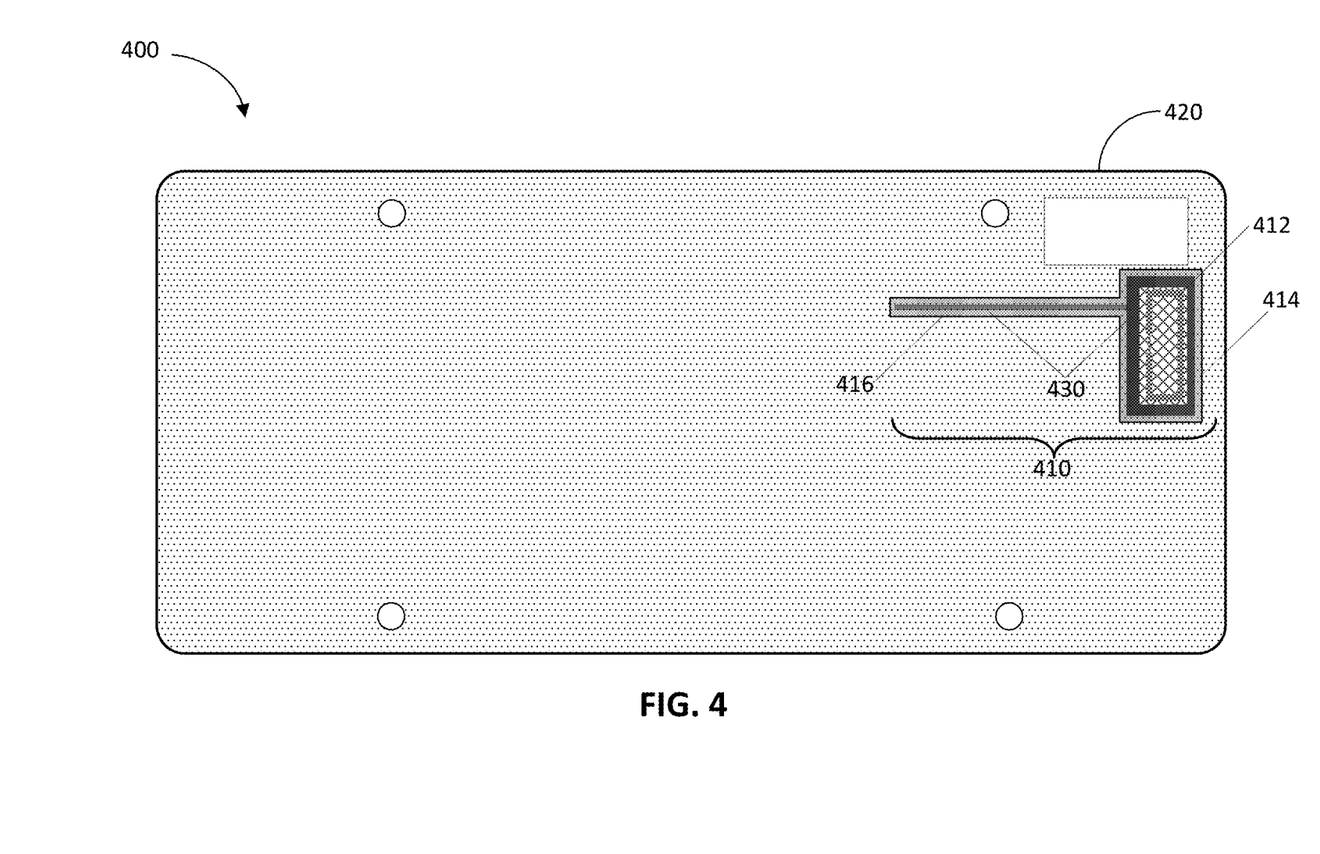
FIG. 4 shows a top-view illustration of an exemplary RFID-enabled license plate including an exemplary RFID assembly integrated with a license plate in accordance with some embodiments described herein.

FIG. 4 shows a top-view illustration of an exemplary RFID-enabled license plate 400 including an exemplary RFID assembly 410 integrated with a license plate 420 in accordance with some embodiments described herein. As can be seen in FIG. 4, RFID-enabled license plate 400 includes RFID assembly 410 which further includes RFID tag 412, a rectangular section 414, and a long and narrow section 416. RFID-enabled license plate 400 also includes a cutout 430 having both a rectangular section and a slot section. Compared to RFID assembly 310 shown in FIG. 3A, RFID assembly 410 in FIG. 4 is positioned on the opposite side of license plate 420 and 90° rotated such that narrow section 416 of the assembly and the slot section of the cutout 430 are both in a horizontal configuration. Moreover, the long and narrow section 416 and the slot section of the cutout 430 are both in an off-centered configuration relative to the rectangular section 414 of RFID assembly 410. As such, placement of the RFID assembly 410 on the RFID-enabled license plate 400 does not interfere with other features on the RFID-enabled license plate 400, including but not limited to, license plate lettering and/or numbering.

Figure 5A:
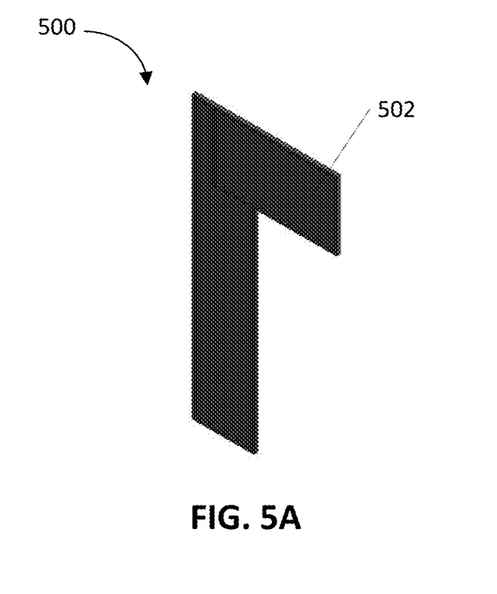
FIG. 5A shows an exemplary construction of a front cover of the proposed tamper-proof and weather-proof RFID assembly in accordance with some embodiments described herein.

FIG. 5A shows an exemplary construction of a front cover 500 of the proposed tamper-proof and weather-proof RFID assembly in accordance with some embodiments described herein. In various embodiments, the front cover 500 can be used to implement front cover 350 and front cover 370 described in conjunctions with FIGS. 3B-3G. In some embodiments, front cover 500 can be an injection molded component. As described above, front cover 500 may include one or more embossed regions for placing adhesives such as VHBs. In the embodiment shown, front cover 500 also includes a compartment 502 which can be used as a pocket or a receptacle for a vehicle registration sticker.

Figure 5B:
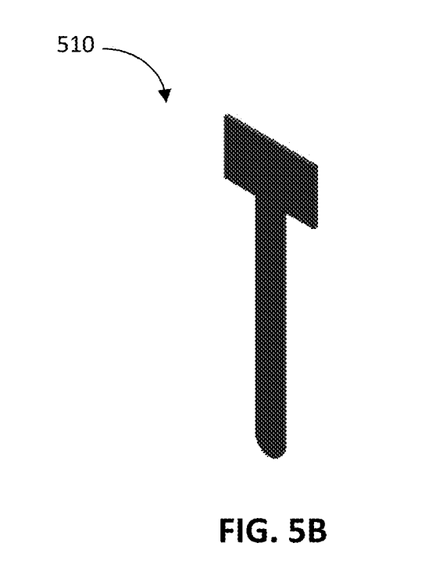
FIG. 5B shows an exemplary construction of a back cover of the proposed tamper-proof and weather-proof RFID assembly in accordance with some embodiments described herein.

FIG. 5B shows an exemplary construction of a back cover 510 of the proposed tamper-proof and weather-proof RFID assembly in accordance with some embodiments described herein. In various embodiments, back cover 510 can be used to implement back cover 360 and back cover 380 described in conjunctions with FIGS. 3B-3G. In some embodiments, back cover 510 can be an injection molded component. Alternately, in some embodiments, back cover 510 can be cut from a flat sheet.

Figure 6A:
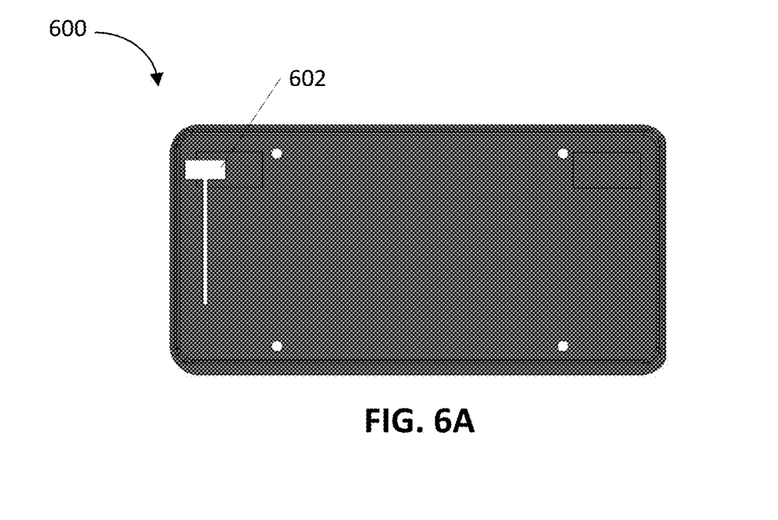
FIG. 6A shows a top view of an exemplary RFID-enabled license plate in accordance with some embodiments described herein.

FIG. 6A shows a top view of an exemplary RFID-enabled license plate 600 in accordance with some embodiments described herein. As can be seen in FIG. 6A, the RFID-enabled license plate 600 includes an RFID assembly 602. In various embodiments, RFID assembly 602 can be implemented using embodiments of RFID assembly 310 described in conjunctions with FIGS. 3B-3G. According to the embodiment shown, RFID assembly 602 includes a vertical slot configured in a substantially centered and downward position relative to the rectangular portion of RFID assembly 602 that includes the RFID tag. In some embodiments, the front cover of RFID assembly 602 can include a molded compartment to serve as a "sticker pocket" for the vehicle registration sticker.

Figure 6B:
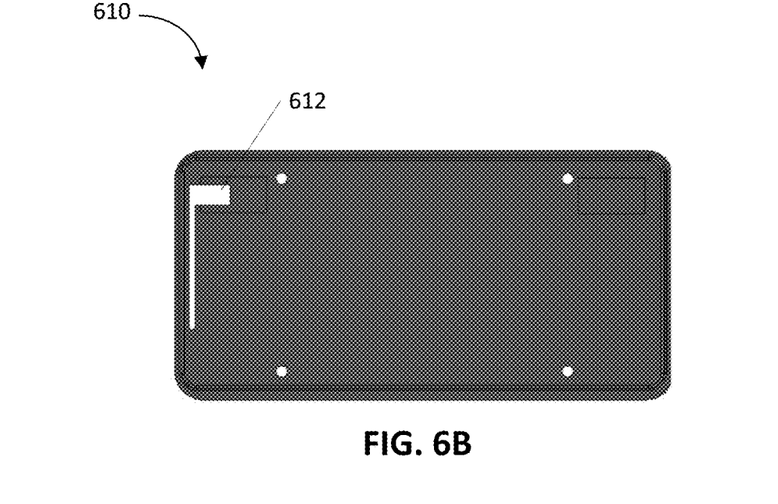
FIG. 6B shows a top view of an exemplary RFID-enabled license plate in accordance with some embodiments described herein.

FIG. 6B shows a top view of an exemplary RFID-enabled license plate 610 in accordance with some embodiments described herein. As can be seen in FIG. 6B, the RFID-enabled license plate 610 includes an RFID assembly 612. In various embodiments, RFID assembly 612 can be implemented using embodiments of RFID assembly 310 described in conjunctions with FIGS. 3B-3G. According to one exemplary embodiment, a vertical slot of the RFID assembly 612 is configured in a substantially off-center position relative to the rectangular portion of RFID assembly 612 that includes the RFID tag. As such, placement of the RFID assembly 612 on the RFID enabled license plate 610 does not interfere with other features on the RFID enabled license plate 610, including but not limited to, license plate lettering and/or numbering.

While the embodiments of the proposed RFID-enabled license plate 300 use an RFID assembly 310 having both a front cover and a back cover, other embodiments of the proposed RFID-enabled license plate can use an RFID assembly with a back cover but without a front cover. In these embodiments, weather-proofing and tamper-proofing of the RFID assembly can be achieved by using the above-described RFID assembly 100 with a protective layer and using VHBs to adhere the RFID tag to the back cover, and then adhere the back cover to the back side of the license plate. Additional VHBs can be used to follow the perimeter of the back cover to completely seal off holes and slots between the RFID assembly and the license plate. Moreover, the slot in the license plate may be positioned near the center and oriented vertically down the center of the plate. In some embodiments, the back cover can be cut from a flat sheet.

Figure 7A:
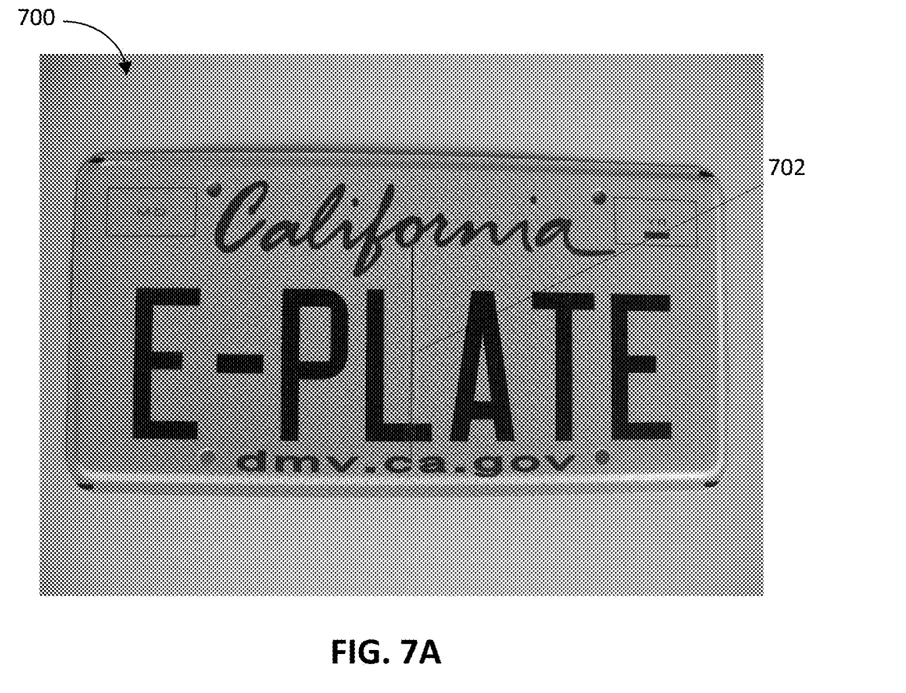
FIG. 7A is a photographic image of the front-side of an exemplary RFID-enabled license plate including an exemplary RFID assembly without a front cover in accordance with some embodiments described herein.

FIG. 7A is a photographic image of the front-side of an exemplary RFID-enabled license plate 700 including an exemplary RFID assembly without a front cover in accordance with some embodiments described herein. In the embodiment shown, RFID-enabled license plate 700 includes a slot 702 positioned down the center of the license plate. In some implementations, slot 702 may be covered with a prismatic material.

Figure 7B:
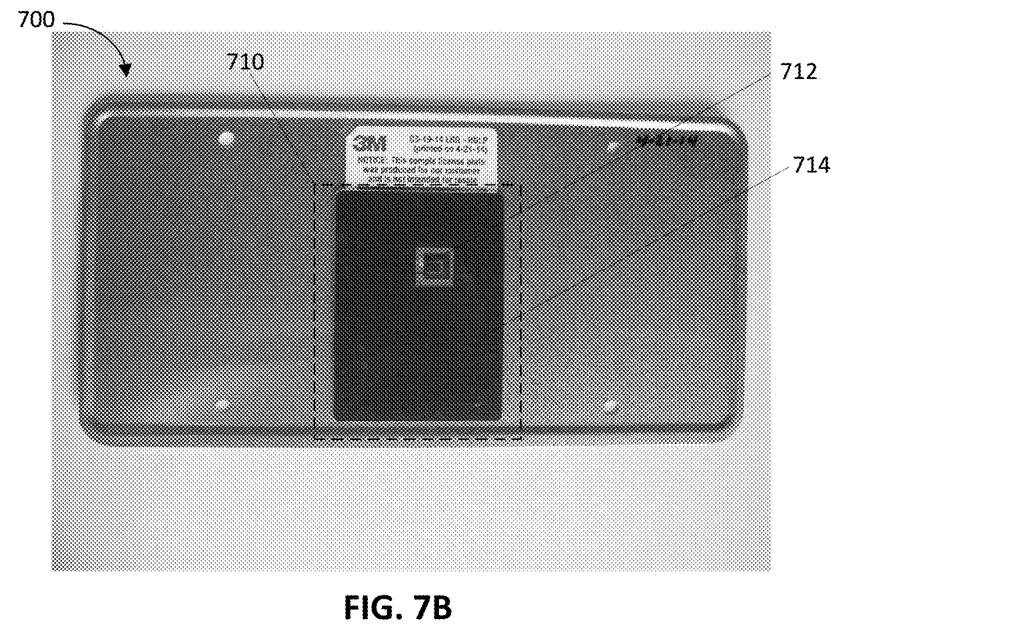
FIG. 7B a photographic image of the back-side of the RFID-enabled license plate shown in FIG. 7A including an exemplary RFID assembly in accordance with some embodiments described herein.

FIG. 7B a photographic image of the back-side of the RFID-enabled license plate 700 including an exemplary RFID assembly 710 in accordance with some embodiments described herein. In the embodiment shown, RFID assembly 710, which includes an RFID tag 712 and a back cover 714, is attached to the back side of RFID-enabled license plate 700. RFID tag 712 can include additional tamper-proof features such as the prefabricated tear guide 150 described above.

In some embodiments, various RFID-enabled license plates described in this patent document can be used in one or more account management applications. For example, the various RFID-enabled license plates can be used to track a vehicle for purposes of electronic tolling, parking access, and border control. At least some of these applications are described in U.S. patent Ser. No. 14/459,299, the disclosure of which is incorporated herein by reference in its entirety.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A radio frequency identification (RFID)-enabled device comprising:
    a plate having a cutout passing from a first side of the plate to a second side of the plate defining a hole extending through the plate;
    a first cover covering the hole on the first side and affixed to the first side forming a weatherproof seal between the first cover and the first side of the plate;
    a second cover covering the hole on the second side, opposite the first cover, the second cover affixed to the plate and forming a weatherproof seal between the second cover and the second side of the plate; and
    a RFID tag disposed within the hole between the first and second cover and adjacent the first cover.

2. The RFID-enabled device of claim 1, wherein the RFID tag comprises a tear guide forming a tamper-proof seal.

3. The RFID-enabled device of claim 1, wherein the first cover is affixed to the first side using an adhesive to form the weatherproof seal.

4. The RFID-enabled device of claim 1 wherein the RFID tag is affixed to at least one of the plate, the first cover, and the second cover.

5. The RFID-enabled device of claim 4 wherein a portion of the first cover is affixed to a portion of the second cover.

6. The RFID-enabled device of claim 1, wherein the cutout comprises:
    a first portion sized to receive the RFID tag; and
    a second portion electrically coupled to the RFID tag and operable as a slot antenna of the plate.

7. The RFID-enabled device of claim 6, wherein the second portion of the cutout is capacitively coupled to the RFID tag, forming the slot antenna.

8. The RFID-enabled device of claim 1, wherein the RFID tag comprises:
    an RFID chip disposed on a substrate;
    an antenna loop disposed on the substrate and electrically coupled to the RFID chip; and
    a protective film layer surrounding the RFID chip and the antenna loop forming a weatherproof enclosure.

* * * * *